(12) United States Patent
Wu et al.

(10) Patent No.: US 11,134,206 B2
(45) Date of Patent: Sep. 28, 2021

(54) IMAGING SYSTEM

(71) Applicant: QISDA CORPORATION, Taoyuan (TW)

(72) Inventors: Tsung-Hsun Wu, Taoyuan (TW); Wei-Chun Chang, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 16/861,228

(22) Filed: Apr. 29, 2020

(65) Prior Publication Data

US 2020/0366855 A1 Nov. 19, 2020

(30) Foreign Application Priority Data

May 15, 2019 (CN) .......................... 201910402779.2

(51) Int. Cl.
*H04N 5/341* (2011.01)
*G02B 27/01* (2006.01)
*G02B 27/10* (2006.01)

(52) U.S. Cl.
CPC ........... *H04N 5/3415* (2013.01); *G02B 27/01* (2013.01); *G02B 27/10* (2013.01)

(58) Field of Classification Search
CPC .................................................. H04N 5/3415
USPC ........................................................ 348/218.1
See application file for complete search history.

(56) References Cited

U.S. PATENT DOCUMENTS

| 9,508,017 B2 | 11/2016 | Jung | |
|---|---|---|---|
| 10,911,729 B2 | 2/2021 | Wu | |
| 2013/0188259 A1* | 7/2013 | Nakamura | G02B 27/0101 359/630 |

FOREIGN PATENT DOCUMENTS

| CN | 101065766 A | 10/2007 |
|---|---|---|
| CN | 203133887 U | 8/2013 |
| CN | 104142576 A | 11/2014 |
| CN | 110161693 A | 8/2019 |

\* cited by examiner

*Primary Examiner* — Joel W Fosselman (57) ABSTRACT

An imaging system includes an image combiner, at least one reflecting mirror, an image generating device and an indication mark. The at least one reflecting mirror is disposed with respect to the image combiner. The image generating device is disposed with respect to the at least one reflecting mirror. When the image generating device displays an image, a light projected by the image generating device is reflected by the at least one reflecting mirror to the image combiner, so as to form a virtual image through the image combiner. The indicating mark is disposed at a periphery of the image combiner.

11 Claims, 9 Drawing Sheets

IMAGING SYSTEM

BACKGROUND OF THE INVENTION

1. Field of the Invention

The invention relates to an imaging system and, more particularly, to an imaging system capable of providing an optimal display size of a virtual image for a user.

2. Description of the Prior Art

As technology advances and develops, an imaging system (e.g. head up display (HUD)) with augmented reality (AR) application or virtual reality (VR) application has become more and more popular in daily life. In general, the imaging system projects an image displayed by a display device to an image combiner (e.g. glass, reflecting mirror, etc.) by optical reflection, so as to generate a virtual image. A size of the virtual image generated by the imaging system changes according to a distance between a user and the imaging system. When the distance between the user and the imaging system is too short, the virtual image will be reduced and then cannot wholly fit the display area of the image combiner. On the other hand, when the distance between the user and the imaging system is too long, the virtual image will be enlarged to exceed a display area of the image combiner, such that the user cannot see complete virtual image.

SUMMARY OF THE INVENTION

An objective of the invention is to provide an imaging system capable of providing an optimal display size of a virtual image for a user, so as to solve the aforesaid problems.

According to an embodiment of the invention, an imaging system comprises an image combiner, at least one reflecting mirror, an image generating device and an indication mark. The at least one reflecting mirror is disposed with respect to the image combiner. The image generating device is disposed with respect to the at least one reflecting mirror. When the image generating device displays an image, a light projected by the image generating device is reflected by the at least one reflecting mirror to the image combiner, so as to form a virtual image through the image combiner. The indication mark is disposed at a periphery of the image combiner.

In this embodiment, the imaging system may further comprise a communication module and a distance sensor. The communication module communicates with the image generating device. The distance sensor is electrically connected to the communication module. The distance sensor senses a distance between an object and the imaging system and transmits the distance to the image generating device through the communication module. When the image generating device determines that the distance is larger than a predetermined threshold, the image generating device adjusts a display size of the image according to the distance.

As mentioned in the above, the invention disposes the indication mark at the periphery of the image combiner to indicate that a maximum size of the virtual image can be displayed by the image combiner. When a user sees that a boundary of the virtual image is away from the indication mark, it means that the distance between the user and the imaging system is too short, such that the virtual image cannot wholly fit the display area of the image combiner. At this time, the user may increase the distance relative to the imaging system according to the indication mark, so as to enable the virtual image to wholly fit the display area of the image combiner. Furthermore, the invention may dispose the distance sensor on the imaging system to sense the distance between the user (i.e. the aforesaid object) and the imaging system. When the distance between the user and the imaging system is larger than the predetermined threshold, it means that the distance between the user and the imaging system is too long, such that the virtual image will exceed a display area of the image combiner. At this time, the image generating device will adjust the display size of the image according to the distance to adjust the size of the virtual image formed by the image combiner correspondingly, so as to ensure that the virtual image does not exceed the display area of the image combiner. Accordingly, the imaging system of the invention can provide an optimal display size of the virtual image for the user.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
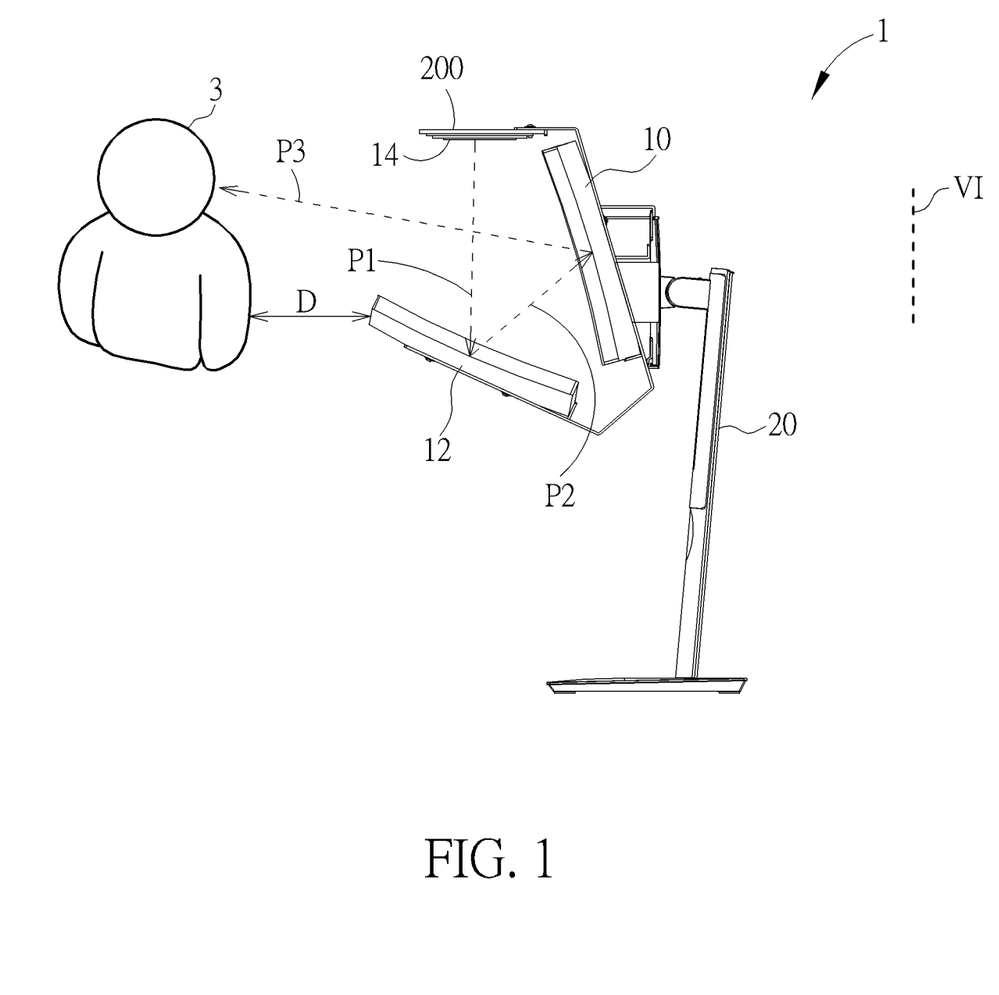
FIG. 1 is a side view illustrating an imaging system according to an embodiment of the invention.
Figure 2:
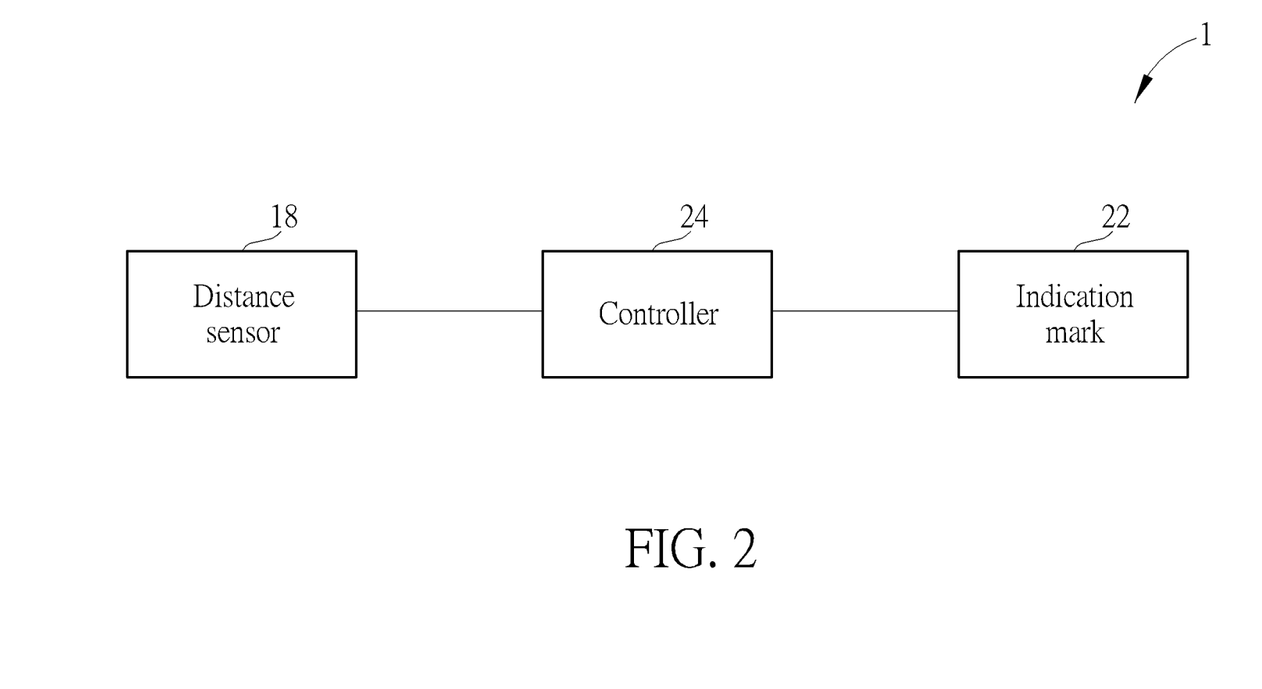
FIG. 2 is a functional block diagram illustrating the imaging system shown in FIG. 1.
Figure 3:
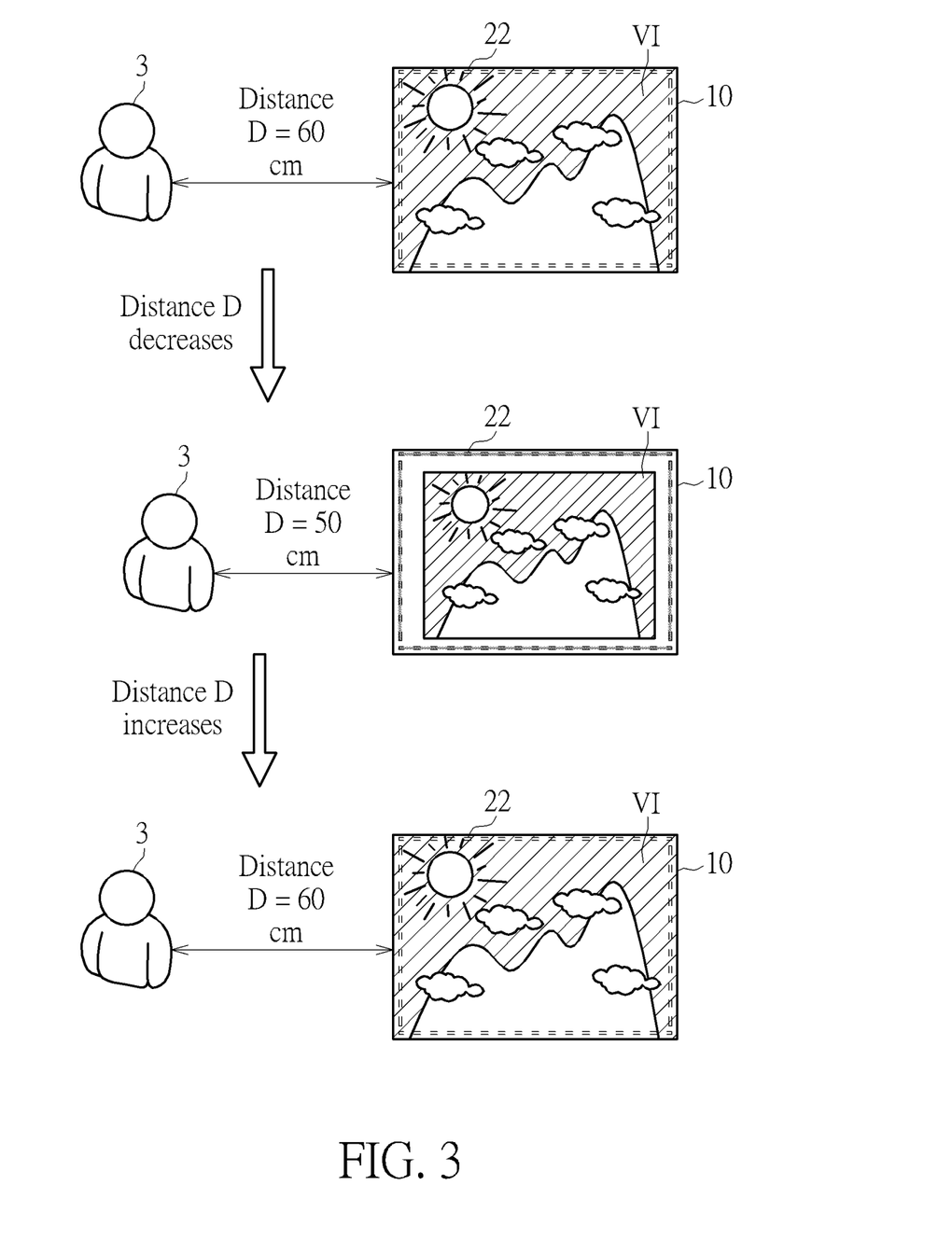
FIG. 3 is a schematic view illustrating an indication mark disposed at a periphery of the image combiner shown in FIG. 1.

Referring to FIGS. 1 to 3, FIG. 1 is a side view illustrating an imaging system 1 according to an embodiment of the invention, FIG. 2 is a functional block diagram illustrating the imaging system 1 shown in FIG. 1, and FIG. 3 is a schematic view illustrating an indication mark 22 disposed at a periphery of the image combiner 10 shown in FIG. 1.

As shown in FIGS. 1 to 3, the imaging system 1 comprises an image combiner 10, at least one reflecting mirror 12, an image generating device 14, a distance sensor 18, a support frame 20, an indication mark 22 and a controller 24, wherein the image combiner 10, the reflecting mirror 12, the image generating device 14, the distance sensor 18 and the controller 24 are disposed on the support frame 20. In this embodiment, the imaging system 1 may be, but not limited to, a head up display or an enlarged display. The image generating device 14 may be a display, a mobile phone or other electronic devices capable of generating images. The image combiner 10 and the reflecting mirror 12 may be, but not limited to, concave reflecting mirrors.

As shown in FIG. 1, the reflecting mirror 12 is disposed with respect to the image combiner 10 and the image generating device 14 is disposed with respect to the reflecting mirror 12. In this embodiment, the support frame 20 may comprise a fixing base 200, such that a user may dispose the image generating device 14 on the fixing base 200. When the image generating device 14 displays an image, the image generating device 14 projects a light to the reflecting mirror 12 along a first optical path P1. Then, the first optical path P1 is reflected by the reflecting mirror 12 to form a second optical path P2. Then, the second optical path P2 forms a virtual image VI through the image combiner 10 and the second optical path P2 is reflected by the image combiner 10 to a user 3 to form a third optical path P3. In other words, when the image generating device 14 displays an image, a light projected by the image generating device 14 is reflected by the reflecting mirror 12 to the image combiner 10, so as to form a virtual image VI through the image combiner 10.

As shown in FIG. 2, the distance sensor 18 is electrically connected to the controller 24. Furthermore, the indication mark 22 is a light source and electrically connected to the controller 24. In this embodiment, the indication mark 22 may consist of four light bars disposed at four sides of the image combiner 10, as shown in FIG. 3. In another embodiment, the indication mark 22 may also be a light source disposed at at least one side and/or at least one corner of the image combiner 10 according to practical applications. The indication mark 22 is configured to indicate that a maximum size of the virtual image can be displayed by the image combiner 10.

The distance sensor 18 is configured to sense a distance D (as shown in FIG. 1) between an object (e.g. the user 3 shown in FIG. 1) and the imaging system 1 and transmit the sensed distance D to the controller 24. After receiving the distance D sensed by the distance sensor 18, the controller 24 determines whether the distance D is smaller than a predetermined threshold. When the controller 24 determines that the distance D is larger than or equal to the predetermined threshold, it means that the virtual image VI has wholly fit the display area of the image combiner 10. At this time, the controller 24 turns off the indication mark 22, such that the indication mark 22 does not emit light. When the controller 24 determines that the distance D is smaller than the predetermined threshold, it means that the distance between the user 3 and the imaging system 1 is too short, such that the virtual image VI cannot wholly fit the display area of the image combiner 10. At this time, the controller 24 turns on the indication mark 22, such that the indication mark 22 emits light to indicate that a maximum size of the virtual image VI can be displayed by the image combiner 10.

It is assumed that the aforesaid predetermined threshold is equal to 60 cm. As shown in FIG. 3, when the distance D between the user 3 and the imaging system 1 is equal to 60 cm, the virtual image VI just wholly fit the display area of the image combiner 10. When the distance D between the user 3 and the imaging system 1 decreases from 60 cm to 50 cm, the virtual image VI cannot wholly fit the display area of the image combiner 10, such that the user 3 sees that the virtual image VI is reduced. At this time, the controller 24 turns on the indication mark 22, such that the indication mark 22 emits light. Accordingly, when the user 3 sees that the boundary of the virtual image VI is away from the indication mark 22, it means that the distance D between the user 3 and the imaging system 1 is too short. At this time, the user 3 may increase the distance D relative to the imaging system 1 according to the indication mark 22. When the distance D between the user 3 and the imaging system 1 increases to 60 cm, the virtual image VI will wholly fit the display area of the image combiner 10. At this time, the controller 24 turns off the indication mark 22, such that the indication mark 22 does not emit light to avoid affecting the user 3 to see the virtual image VI.

Figure 4:
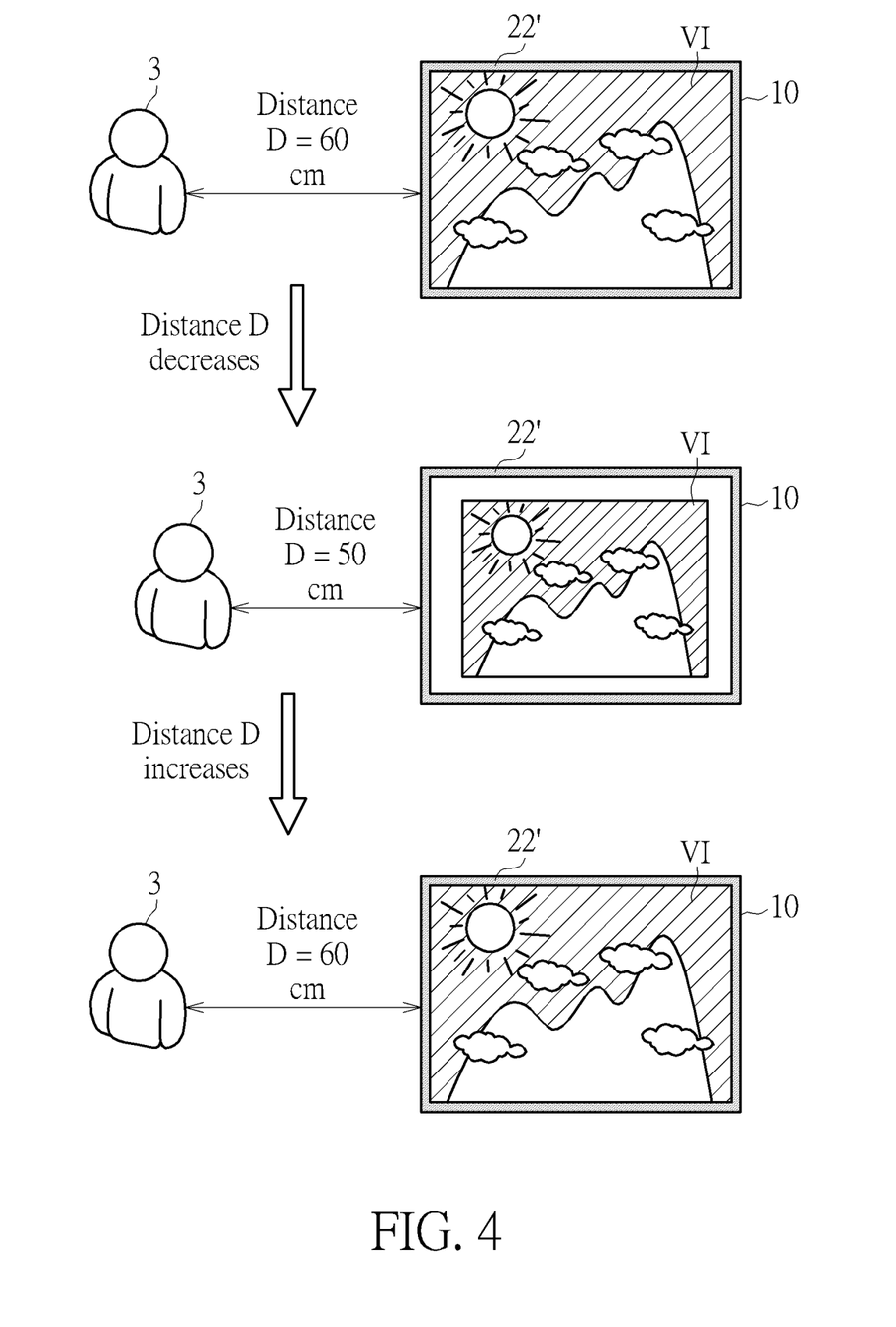
FIG. 4 is a schematic view illustrating an indication mark according to another embodiment of the invention.

Referring to FIG. 4, FIG. 4 is a schematic view illustrating an indication mark 22' according to another embodiment of the invention. In this embodiment, the indication mark 22' may be a fixed color, pattern, symbol or other marks. At this time, the aforesaid distance sensor 18 may be removed from the imaging system 1. Furthermore, the indication mark 22' may surround the image combiner 10 to form a ring-shaped frame. In another embodiment, the indication mark 22' may also be disposed at at least one side and/or at least one corner of the image combiner 10 according to practical applications. The indication mark 22' is also configured to indicate that a maximum size of the virtual image can be displayed by the image combiner 10.

As shown in FIG. 4, when the distance D between the user 3 and the imaging system 1 is equal to 60 cm, the virtual image VI just wholly fit the display area of the image combiner 10. When the distance D between the user 3 and the imaging system 1 decreases from 60 cm to 50 cm, the virtual image VI cannot wholly fit the display area of the image combiner 10, such that the user 3 sees that the virtual image VI is reduced. At this time, a boundary of the virtual image VI is away from the indication mark 22'. Accordingly, when the user 3 sees that the boundary of the virtual image VI is away from the indication mark 22', it means that the distance D between the user 3 and the imaging system 1 is too short. At this time, the user 3 may increase the distance D relative to the imaging system 1 according to the indication mark 22'. When the distance D between the user 3 and the imaging system 1 increases to 60 cm, the virtual image VI will wholly fit the display area of the image combiner 10.

Accordingly, when the distance D between the user 3 and the imaging system 1 is too short (i.e. smaller than the predetermined threshold), the invention can provide an optimal display size of the virtual image for the user 3 by the indication mark 22, 22'.

Figure 5:
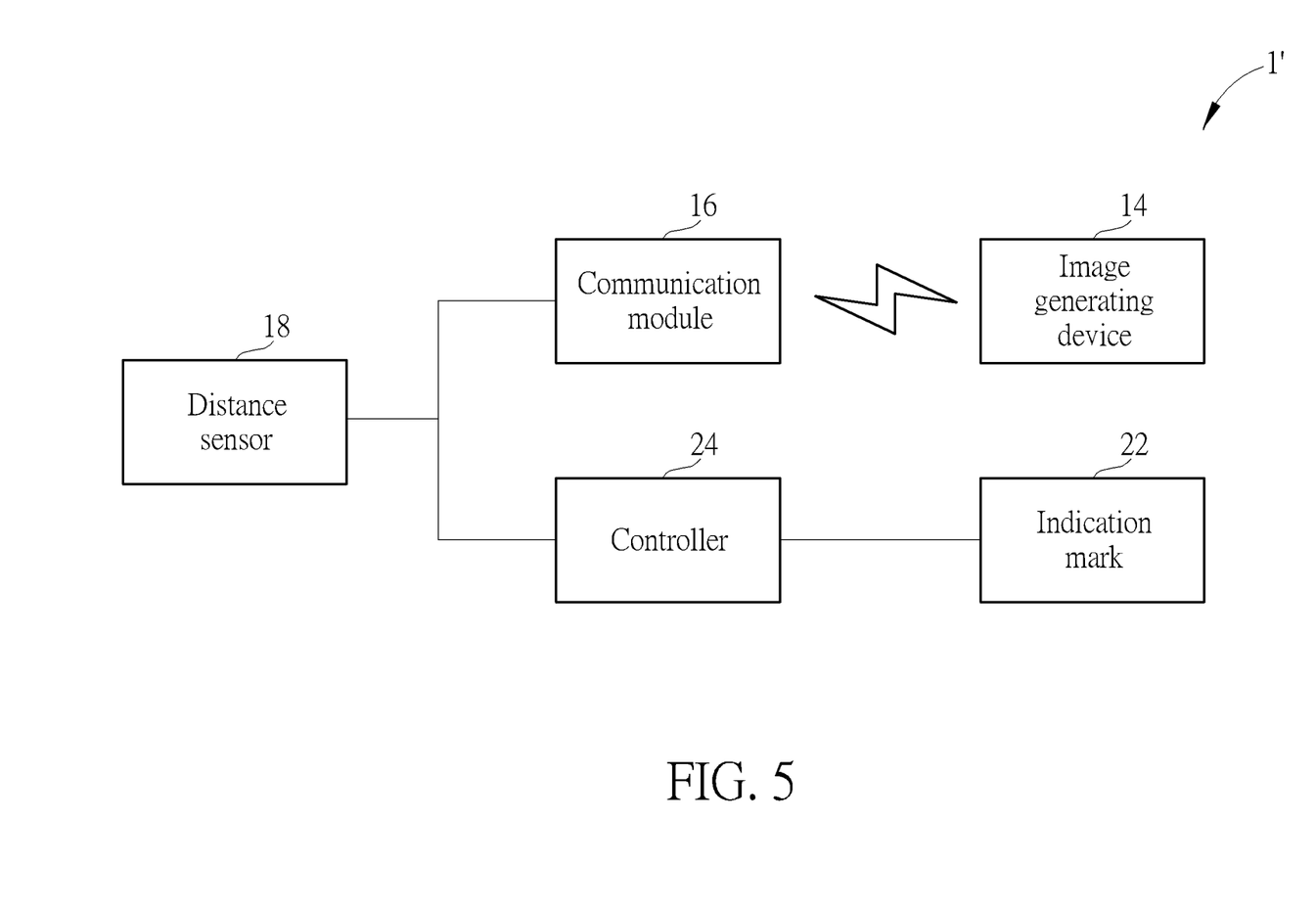
FIG. 5 is a functional block diagram illustrating an imaging system according to another embodiment of the invention.
Figure 6:
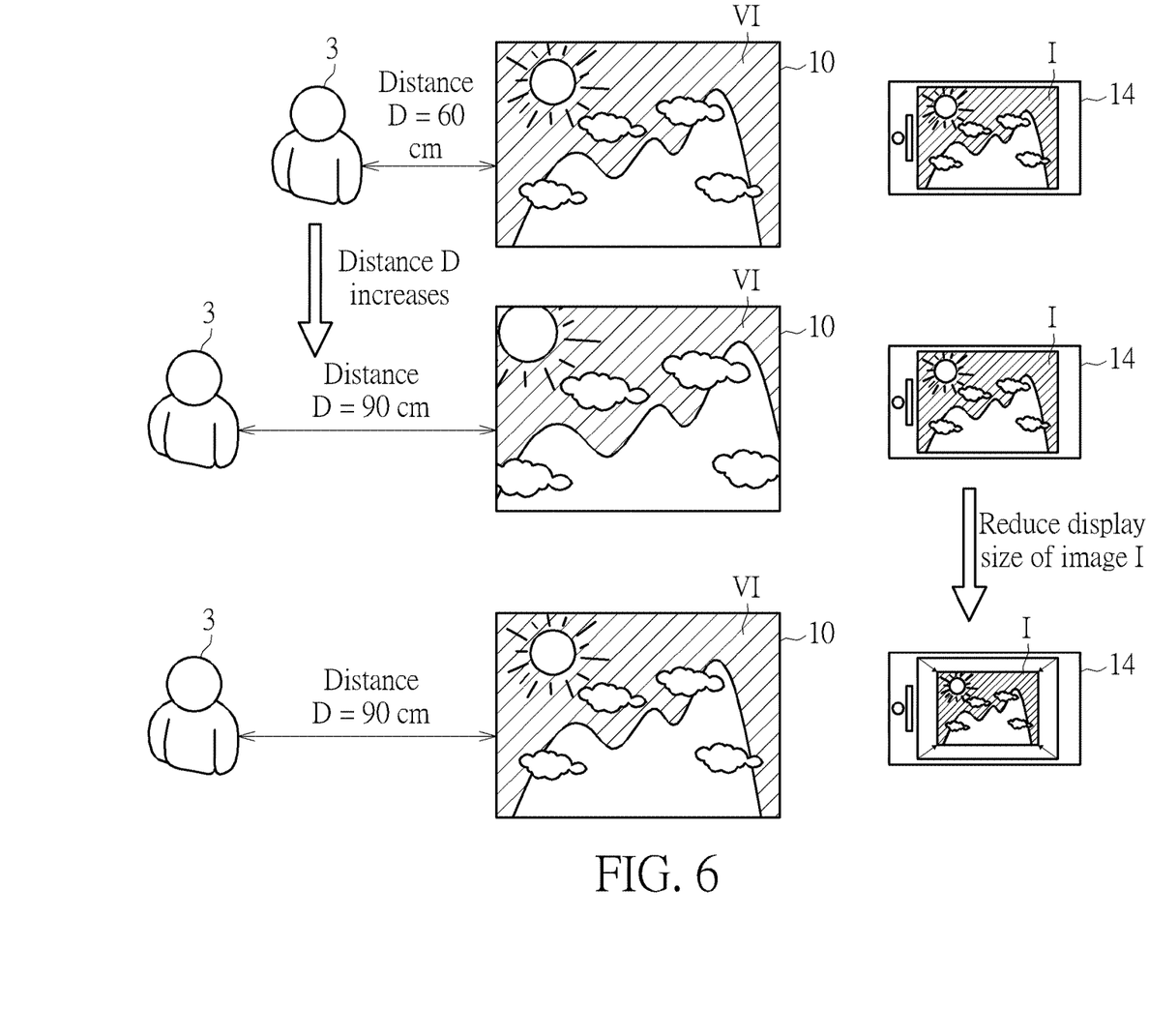
FIG. 6 is a schematic view illustrating that the display size of the virtual image is adjusted by adjusting the display size of the image.
Figure 7:
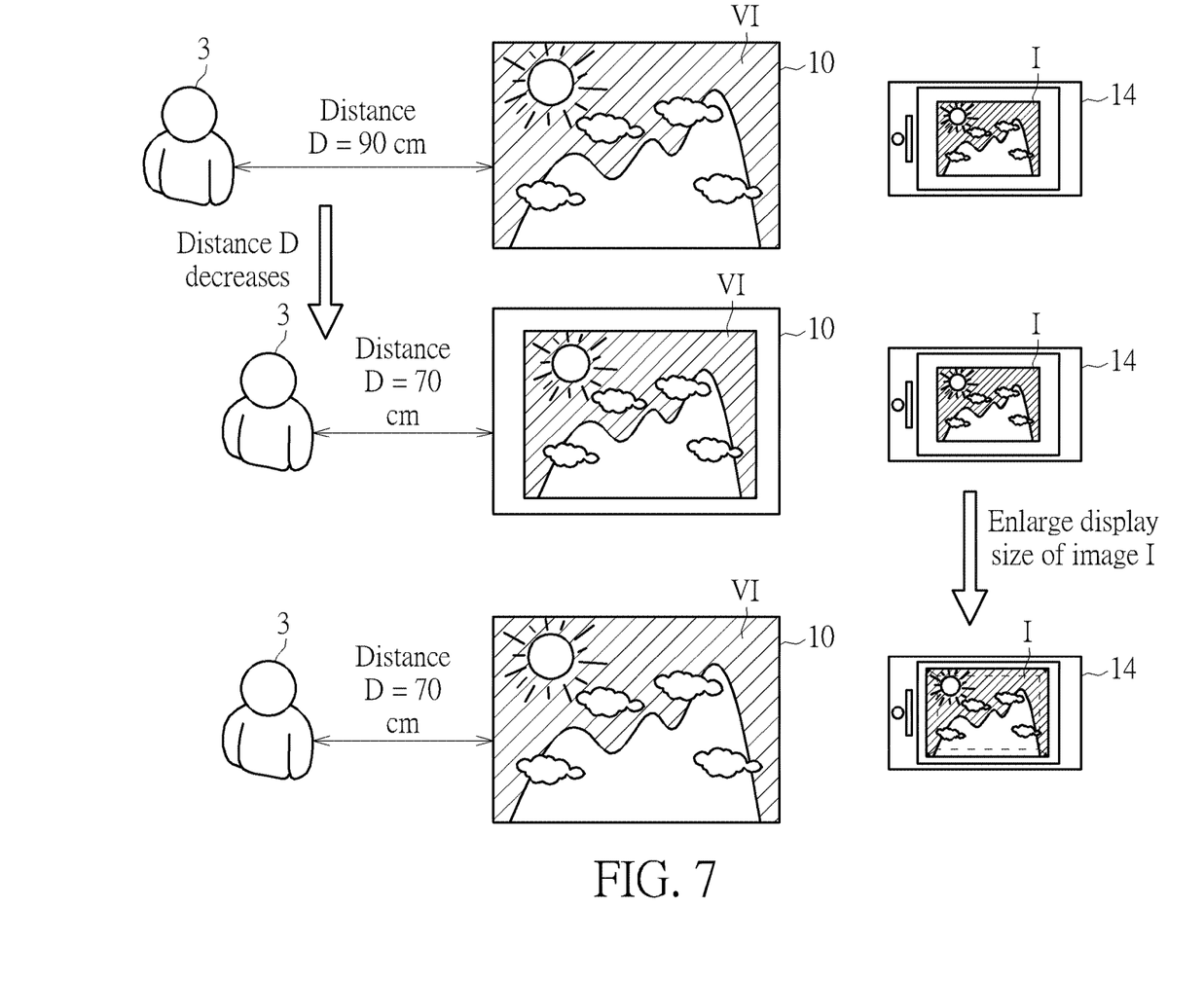
FIG. 7 is another schematic view illustrating that the display size of the virtual image is adjusted by adjusting the display size of the image.

Referring to FIGS. 5 to 7, FIG. 5 is a functional block diagram illustrating an imaging system 1' according to another embodiment of the invention, FIG. 6 is a schematic view illustrating that the display size of the virtual image VI is adjusted by adjusting the display size of the image I, and FIG. 7 is another schematic view illustrating that the display size of the virtual image VI is adjusted by adjusting the display size of the image I.

The main difference between the imaging system 1' and the aforesaid imaging system 1 is that the imaging system 1' further comprises a communication module 16. It should be noted that the imaging system 1' also comprises the image combiner 10, the reflecting mirror 12, the image generating device 14 and the distance sensor 18 and the principles of those components have been mentioned in the above, so the repeated explanation will not be depicted herein again. The communication module 16 is configured to communicate with the image generating device 14 and the distance sensor 18 is electrically connected to the communication module 16, as shown in FIG. 5. In this embodiment, the communication module 16 may communicate with the image generating device 14 in a wired or wireless manner. For example, the communication module 16 may be a universal serial bus (USB) port or other ports for communicating with the image generating device 14 in a wired manner. Furthermore, the communication module may also be a wireless communication module (e.g. WiFi, Bluetooth, etc.) for communicating with the image generating device 14 in a wireless manner.

In this embodiment, the distance sensor 18 also transmits the sensed distance D to the image generating device 14 through the communication module 16. After receiving the distance D sensed by the distance sensor 18, the image generating device 14 determines whether the distance D is larger than the aforesaid predetermined threshold. When the image generating device 14 determines that the distance D is larger than the predetermined threshold, it means that the distance between the user 3 and the imaging system 1' is too long, such that the virtual image VI will exceed a display area of the image combiner 10. At this time, the image generating device 14 will adjust a display size of the image I (as shown in FIG. 6) according to the distance D to adjust the size of the virtual image VI formed by the image combiner 10 correspondingly, so as to ensure that the virtual image VI does not exceed the display area of the image combiner 10. In this embodiment, the image generating device 14 may adjust the display size of the image I by a scaler. On the other hand, when the image generating device 14 determines that the distance D is smaller than or equal to the predetermined threshold, it means that the virtual image VI will not exceed the display area of the image combiner 10. At this time, the image generating device 14 may display the image I by a maximum display size.

In this embodiment, when the image generating device 14 determines that the distance D is larger than the predetermined threshold, the image generating device 14 may reduce the display size of the image I as the distance D increases and the image generating device 14 may enlarge the display size of the image I as the distance D decreases.

It is assumed that the aforesaid predetermined threshold is equal to 60 cm. As shown in FIG. 6, when the distance D between the user 3 and the imaging system 1' is equal to 60 cm and the image generating device 14 displays the image I by the maximum display size, the virtual image VI just wholly fit the display area of the image combiner 10. When the distance D between the user 3 and the imaging system 1' increases from 60 cm to 90 cm (larger than the predetermined threshold) and the image generating device 14 still displays the image I by the maximum display size, the virtual image VI exceeds the display area of the image combiner 10, such that the user 3 cannot see complete virtual image VI. At this time, the image generating device 14 may reduce the display size of the image I (e.g. from 100% to 80%) as the distance D increases to adjust the size of the virtual image VI formed by the image combiner 10 correspondingly, so as to ensure that the virtual image VI does not exceed the display area of the image combiner 10.

Furthermore, as shown in FIG. 7, when the distance D between the user 3 and the imaging system 1' decreases from 90 cm to 70 cm (still larger than the predetermined threshold), the virtual image VI cannot wholly fit the display area of the image combiner 10, such that the user 3 sees that the virtual image VI is reduced. At this time, the image generating device 14 may enlarge the display size of the image I (e.g. from 80% to 90%) as the distance D decreases to adjust the size of the virtual image VI formed by the image combiner 10 correspondingly, so as to enable the virtual image VI to wholly fit the display area of the image combiner 10.

Accordingly, when the distance D between the user 3 and the imaging system 1' is larger than the predetermined threshold, the invention can provide an optimal display size of the virtual image for the user 3 by the aforesaid adjusting manner. It should be noted that when the image generating device 14 displays the image I by the maximum display size and the user 3 sees that the virtual image VI just wholly fit the display area of the image combiner 10, the current distance between the user 3 and the imaging system 1' may be set as the aforesaid predetermined threshold. Furthermore, the percentage of reducing or enlarging the display size of the image I may be determined according to practical applications.

Figure 8:
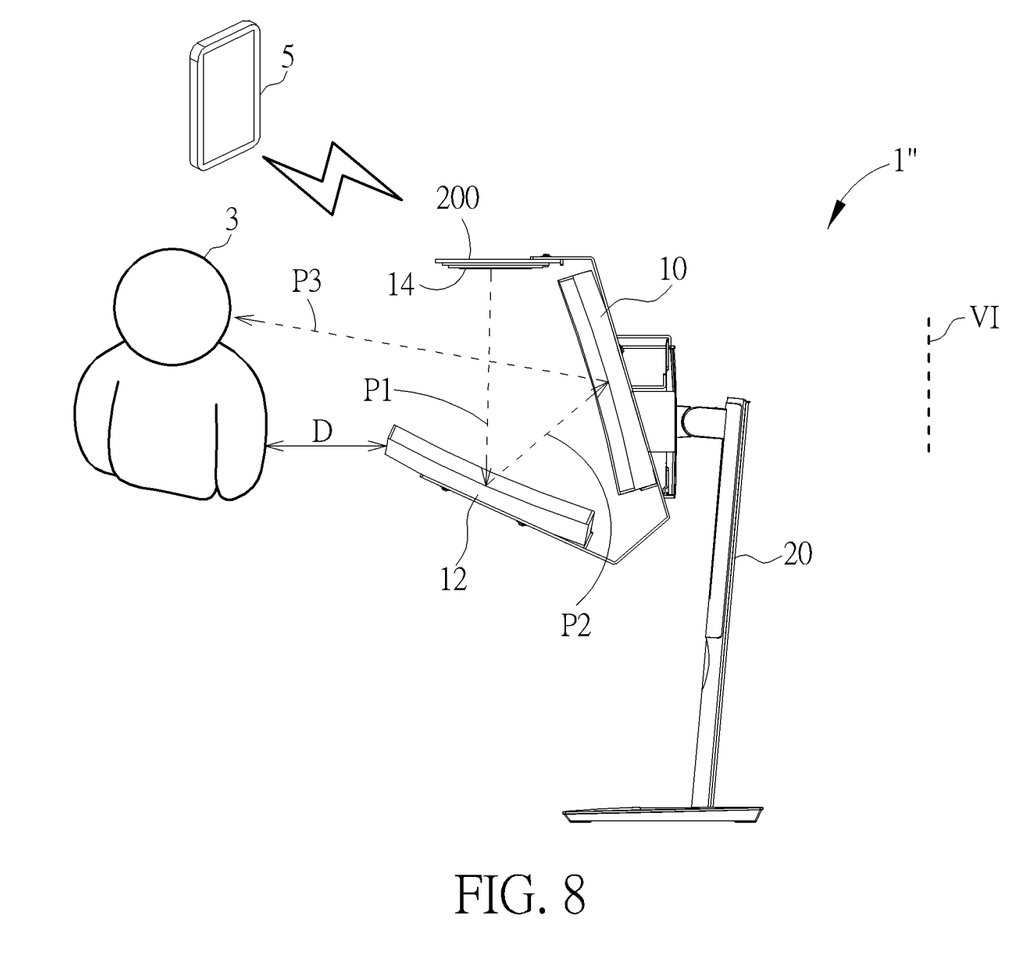
FIG. 8 is a side view illustrating an imaging system according to another embodiment of the invention.

Referring to FIG. 8, FIG. 8 is a side view illustrating an imaging system 1" according to another embodiment of the invention. The main difference between the imaging system 1' and the aforesaid imaging system. 1 is that the image generating device 14 of the imaging system 1' communicates with an external device 5, as shown in FIG. 8. Accordingly, the aforesaid image I may be transmitted to the image generating device 14 by the external device 5 and then the image generating device 14 displays the image I. In practical applications, the external device 5 may be a mobile phone, a tablet computer or other electronic devices. It should be noted that the aforesaid manner of adjusting the display size of the virtual image VI is also adapted to the imaging system 1", so the repeated explanation will not be depicted herein again.

Figure 9:
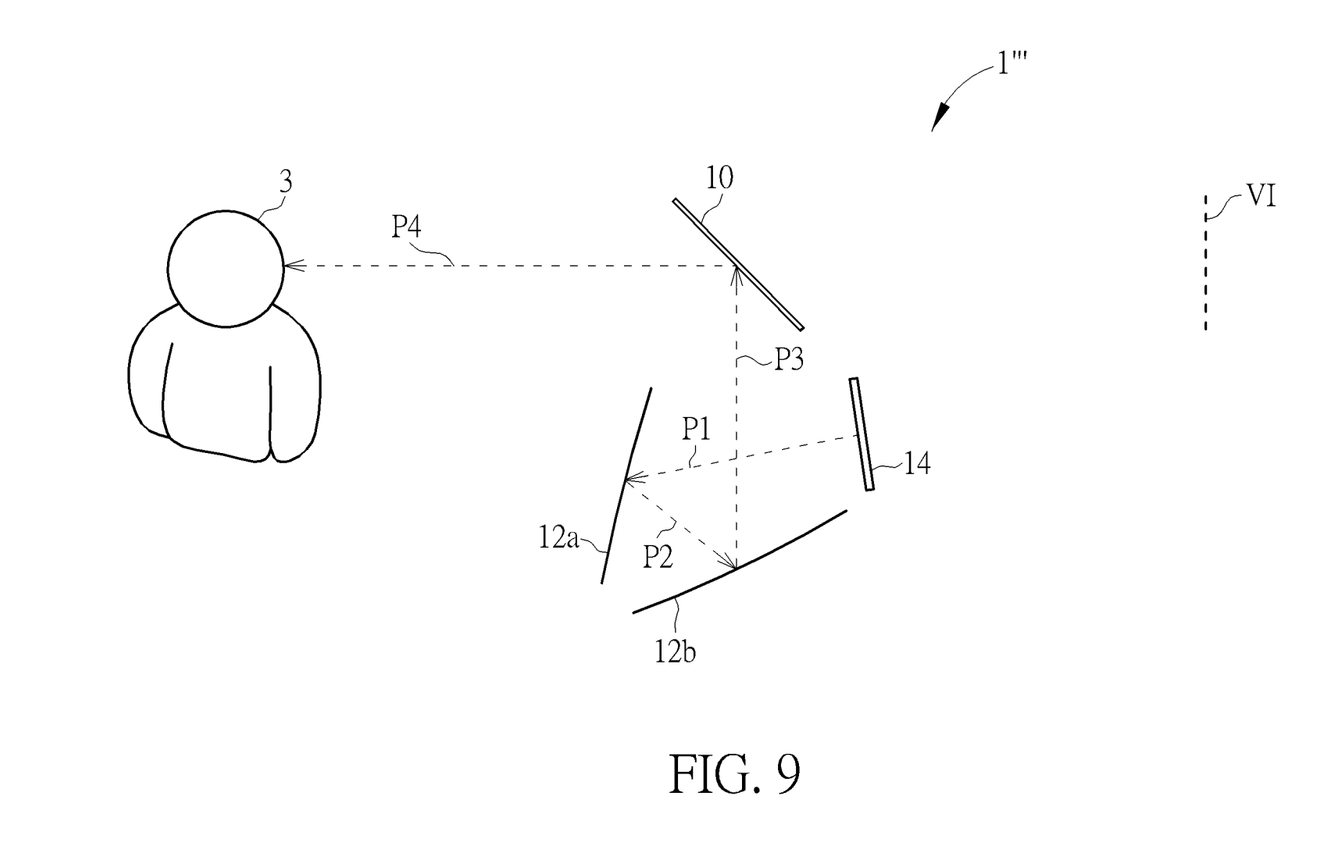
FIG. 9 is a side view illustrating an imaging system according to another embodiment of the invention.

Referring to FIG. 9, FIG. 9 is a side view illustrating an imaging system 1''' according to another embodiment of the invention. The main difference between the imaging system 1''' and the aforesaid imaging system 1 is that the imaging system 1''' comprises two reflecting mirrors 12a, 12b, as shown in FIG. 9. In this embodiment, the two reflecting mirrors 12a, 12b may be aspherical reflecting mirrors. The image combiner 10 may be a reflecting mirror or a transflective (half-refection and half-transmission) component. When the image combiner 10 is a transflective component, the transmittance and the reflectance of the image combiner 10 may be adjusted by optical coating technology. For example, when the imaging system 1''' is a head up display, the image combiner 10 may be a windshield of a vehicle and the transmittance of the image combiner 10 may be larger than the reflectance thereof, such that the imaging system 1''' may be applied to an application of augmented reality (AR). Furthermore, when the imaging system 1''' is an enlarged display (e.g. China Patent No. 208000411U), the reflectance of the image combiner 10 may be larger than the transmittance thereof, such that the imaging system 1''' may be applied to an application of virtual reality (VR).

As shown in FIG. 9, the reflecting mirror 12a is disposed with respect to the image generating device 14, the reflecting mirror 12b is disposed with respect to the reflecting mirror 12a, and the image combiner 10 is disposed with respect to the reflecting mirror 12b. When the image generating device 14 displays an image, the image generating device 14 projects a light to the reflecting mirror 12a along a first optical path P1. Then, the first optical path P1 is reflected by the reflecting mirror 12a to form a second optical path P2. Then, the second optical path P2 is reflected by the reflecting mirror 12b to form a third optical path P3. Then, the third optical path P3 forms a virtual image VI through the image combiner 10 and the third optical path P3 is reflected by the image combiner 10 to a user 3 to form a fourth optical path P4. In other words, a light projected by the image generating device 14 is reflected by the reflecting mirrors 12a, 12b in sequence to the image combiner 10, so as to form a virtual image VI through the image combiner 10. It should be noted that the aforesaid manner of adjusting the display size of the virtual image VI is also adapted to the imaging system 1''', so the repeated explanation will not be depicted herein again.

Furthermore, the invention may also dispose more than two reflecting mirrors in the imaging system and the light projected by the image generating device 14 may be reflected to the image combiner 10 by more than two reflecting mirrors through the arrangement of optical paths.

As mentioned in the above, the invention disposes the indication mark at the periphery of the image combiner to indicate that a maximum size of the virtual image can be displayed by the image combiner. When a user sees that a boundary of the virtual image is away from the indication mark, it means that the distance between the user and the imaging system is too short, such that the virtual image cannot wholly fit the display area of the image combiner. At this time, the user may increase the distance relative to the imaging system according to the indication mark, so as to enable the virtual image to wholly fit the display area of the image combiner. Furthermore, the invention may dispose the distance sensor on the imaging system to sense the distance between the user (i.e. the aforesaid object) and the imaging system. When the distance between the user and the imaging system is larger than the predetermined threshold, it means that the distance between the user and the imaging system is too long, such that the virtual image will exceed a display area of the image combiner. At this time, the image generating device will adjust the display size of the image according to the distance to adjust the size of the virtual image formed by the image combiner correspondingly, so as to ensure that the virtual image does not exceed the display area of the image combiner. Accordingly, the imaging system of the invention can provide an optimal display size of the virtual image for the user.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An imaging system comprising:
    an image combiner;
    at least one reflecting mirror disposed with respect to the image combiner;
    an image generating device disposed with respect to the at least one reflecting mirror, when the image generating device displays an image, a light projected by the image generating device being reflected by the at least one reflecting mirror to the image combiner, so as to form a virtual image through the image combiner;
    a controller;
    a distance sensor electrically connected to the controller; and
    an indication mark disposed at a periphery of the image combiner and electrically connected to the controller, the indication mark being a light source;
    wherein the distance sensor senses a distance between an object and the imaging system; when the controller determines that the distance is larger than or equal to a predetermined threshold, the controller turns off the indication mark; when the controller determines that the distance is smaller than the predetermined threshold, the controller turns on the indication mark, such that the indication mark emits light.

2. The imaging system of claim 1, wherein the indication mark surrounds the image combiner to form a ring-shaped frame.

3. The imaging system of claim 1, further comprising a communication module, the communication module communicating with the image generating device, the distance sensor being electrically connected to the communication module, wherein the distance sensor senses the distance between the object and the imaging system and transmits the distance to the image generating device through the communication module; when the image generating device determines that the distance is larger than the predetermined threshold, the image generating device adjusts a display size of the image according to the distance.

4. The imaging system of claim 3, wherein when the image generating device determines that the distance is larger than the predetermined threshold, the image generating device reduces the display size of the image as the distance increases and the image generating device enlarges the display size of the image as the distance decreases.

5. The imaging system of claim 3, wherein when the image generating device determines that the distance is smaller than or equal to the predetermined threshold, the image generating device displays the image by a maximum display size.

6. The imaging system of claim 1, wherein the image generating device communicates with an external device and the image is transmitted to the image generating device by the external device.

7. An imaging system comprising:
    an image combiner;
    at least one reflecting mirror disposed with respect to the image combiner;
    an image generating device disposed with respect to the at least one reflecting mirror, when the image generating device displays an image, a light projected by the image generating device being reflected by the at least one reflecting mirror to the image combiner, so as to form a virtual image through the image combiner;
    an indication mark disposed at a periphery of the image combiner;
    a communication module communicating with the image generating device; and
    a distance sensor electrically connected to the communication module;
    wherein the distance sensor senses a distance between an object and the imaging system and transmits the distance to the image generating device through the communication module; when the image generating device determines that the distance is larger than a predetermined threshold, the image generating device adjusts a display size of the image according to the distance.

8. The imaging system of claim 7, wherein the indication mark surrounds the image combiner to form a ring-shaped frame.

9. The imaging system of claim 7, wherein when the image generating device determines that the distance is larger than the predetermined threshold, the image generating device reduces the display size of the image as the distance increases and the image generating device enlarges the display size of the image as the distance decreases.

10. The imaging system of claim 7, wherein when the image generating device determines that the distance is smaller than or equal to the predetermined threshold, the image generating device displays the image by a maximum display size.

11. The imaging system of claim 7, wherein the image generating device communicates with an external device and the image is transmitted to the image generating device by the external device.

\* \* \* \* \*